(12) United States Patent
Riding

(10) Patent No.: US 11,043,230 B1
(45) Date of Patent: Jun. 22, 2021

(54) TARGETED CONTENT BASED ON USER REACTIONS

(71) Applicant: WideOrbit Inc., San Francisco, CA (US)

(72) Inventor: Christopher M. Riding, Santa Clarita, CA (US)

(73) Assignee: WideOrbit Inc., San Francisco, CA (US)

( * ) Notice: Subject to any disclaimer, the term of this patent is extended or adjusted under 35 U.S.C. 154(b) by 75 days.

(21) Appl. No.: 15/880,265

(22) Filed: Jan. 25, 2018

(51) Int. Cl.
*G06F 40/205* (2020.01)
*G06Q 30/02* (2012.01)
*G10L 25/54* (2013.01)
*G10L 25/63* (2013.01)

(52) U.S. Cl.
CPC ............ *G10L 25/63* (2013.01); *G06F 40/205* (2020.01); *G06Q 30/0269* (2013.01); *G10L 25/54* (2013.01)

(58) Field of Classification Search
CPC .............. G06Q 30/02; G06Q 30/0269; G06F 17/2705; G10L 25/63
See application file for complete search history.

(56) References Cited

U.S. PATENT DOCUMENTS

| | | | |
|---|---|---|---|
| 5,926,605 A * | 7/1999 | Ichimura | H04N 5/781 360/72.1 |
| 7,690,013 B1 | 3/2010 | Eldering et al. | |
| 7,921,036 B1 | 4/2011 | Sharma et al. | |
| 8,731,610 B2 | 5/2014 | Appaji | |
| 8,806,530 B1 | 8/2014 | Izdepski et al. | |
| 9,189,287 B1 | 11/2015 | Elder | |
| 9,571,606 B2 | 2/2017 | Winograd | |
| 9,614,734 B1 | 4/2017 | Lazarescu et al. | |
| 10,341,723 B2 * | 7/2019 | Benedetto | H04N 21/44204 |
| 10,853,220 B2 * | 12/2020 | Doggett | G06F 11/3006 |
| 2002/0072952 A1 * | 6/2002 | Hamzy | G06Q 30/02 705/7.29 |
| 2002/0100046 A1 | 7/2002 | Dudkiewicz | |
| 2004/0186719 A1 * | 9/2004 | Polanyi | G06F 17/277 704/257 |
| 2005/0281410 A1 * | 12/2005 | Grosvenor | H04H 60/04 381/61 |
| 2007/0071206 A1 * | 3/2007 | Gainsboro | H04M 3/2281 379/168 |

(Continued)

FOREIGN PATENT DOCUMENTS

| | | | | |
|---|---|---|---|---|
| EP | 2972972 B1 * | 1/2016 | | H04L 69/28 |
| WO | WO-2014158895 A2 * | 10/2014 | | H04L 67/22 |

OTHER PUBLICATIONS

Calder, Bobby J., Edward C. Malthouse, and Ute Schaedel. "An experimental study of the relationship between online engagement and advertising effectiveness." Journal of interactive marketing 23.4 (2009): 321-331. (Year: 2009).*

(Continued)

*Primary Examiner* — Daniel C Washburn
*Assistant Examiner* — Oluwadamilola M Ogunbiyi
(74) *Attorney, Agent, or Firm* — Invoke

(57) ABSTRACT

Techniques for identifying content displayed by a content presentation system associated with a physical environment, detecting an audible expression by a user located within the physical environment, and storing information associated with the audible expression in relation to the displayed content are disclosed.

24 Claims, 5 Drawing Sheets

(56) References Cited

U.S. PATENT DOCUMENTS

| | | | |
|---|---|---|---|
| 2008/0091512 A1 | 4/2008 | Marci et al. | |
| 2008/0306849 A1 | 12/2008 | Johnson et al. | |
| 2008/0319763 A1* | 12/2008 | Di Fabbrizio | G10L 15/28 |
| | | | 704/275 |
| 2009/0132355 A1 | 5/2009 | Begeja et al. | |
| 2009/0299820 A1* | 12/2009 | Wang | G06Q 30/0214 |
| | | | 705/14.16 |
| 2010/0060722 A1 | 3/2010 | Bell | |
| 2010/0063880 A1* | 3/2010 | Atsmon | G06Q 10/0637 |
| | | | 705/14.53 |
| 2010/0070992 A1 | 3/2010 | Morris et al. | |
| 2010/0177938 A1 | 7/2010 | Martinez et al. | |
| 2010/0269127 A1* | 10/2010 | Krug | H04H 60/33 |
| | | | 725/18 |
| 2010/0287475 A1* | 11/2010 | van Zwol | G06F 3/04817 |
| | | | 715/723 |
| 2011/0201971 A1* | 8/2011 | Kimura | A61B 5/0488 |
| | | | 600/595 |
| 2011/0247036 A1 | 10/2011 | Adimatyam et al. | |
| 2011/0263946 A1 | 10/2011 | El et al. | |
| 2012/0032894 A1 | 2/2012 | Parivar et al. | |
| 2012/0124604 A1* | 5/2012 | Small | H04N 21/4223 |
| | | | 725/12 |
| 2012/0259722 A1* | 10/2012 | Mikurak | G06Q 10/087 |
| | | | 705/26.1 |
| 2013/0036434 A1 | 2/2013 | Shkedi et al. | |
| 2013/0077820 A1 | 3/2013 | Marais et al. | |
| 2013/0110900 A1 | 5/2013 | Des et al. | |
| 2013/0144940 A1 | 6/2013 | Law | |
| 2013/0157563 A1 | 6/2013 | Jain et al. | |
| 2013/0167167 A1 | 6/2013 | Steyer et al. | |
| 2013/0218663 A1 | 8/2013 | El et al. | |
| 2014/0006158 A1* | 1/2014 | Cooper | G06Q 30/02 |
| | | | 705/14.56 |
| 2014/0082654 A1 | 3/2014 | Van et al. | |
| 2014/0084165 A1 | 3/2014 | Fadell et al. | |
| 2014/0245103 A1 | 8/2014 | Torii et al. | |
| 2014/0270683 A1* | 9/2014 | Zhu | H04N 21/44222 |
| | | | 386/224 |
| 2014/0280879 A1 | 9/2014 | Skolicki | |
| 2014/0282280 A1 | 9/2014 | Pack et al. | |
| 2014/0359647 A1 | 12/2014 | Shoemake et al. | |
| 2014/0376785 A1* | 12/2014 | Bathiche | G06K 9/00335 |
| | | | 382/118 |
| 2015/0073916 A1* | 3/2015 | Bhamidipati | H04N 21/25891 |
| | | | 705/14.66 |
| 2015/0112796 A1* | 4/2015 | Greenzeiger | G06Q 30/0251 |
| | | | 705/14.49 |
| 2015/0161649 A1* | 6/2015 | Eggleston | G06Q 30/0631 |
| | | | 705/14.36 |
| 2015/0177842 A1 | 6/2015 | Rudenko | |
| 2015/0242679 A1* | 8/2015 | Naveh | G06F 16/5866 |
| | | | 382/100 |
| 2015/0245103 A1 | 8/2015 | Conte | |
| 2015/0287410 A1* | 10/2015 | Mengibar | G10L 17/005 |
| | | | 704/246 |
| 2015/0331655 A1 | 11/2015 | Candelore | |
| 2015/0379989 A1* | 12/2015 | Balasubramanian | |
| | | | G06Q 30/0269 |
| | | | 704/233 |
| 2016/0019915 A1* | 1/2016 | Khan | G10L 25/63 |
| | | | 704/239 |
| 2016/0037213 A1 | 2/2016 | Collins et al. | |
| 2016/0063989 A1* | 3/2016 | Deleeuw | G10L 15/22 |
| | | | 345/473 |
| 2016/0092932 A1* | 3/2016 | Bharath | G06Q 30/0271 |
| | | | 705/14.67 |
| 2016/0275566 A1* | 9/2016 | Sparrow | G06Q 30/0261 |
| 2016/0314498 A1* | 10/2016 | Srivastava | G06Q 10/10 |
| 2016/0335366 A1* | 11/2016 | Zhang | G06F 16/23 |
| 2016/0335677 A1* | 11/2016 | Aleksic | G10L 13/00 |
| 2017/0134803 A1* | 5/2017 | Shaw | G10L 15/01 |
| 2017/0249438 A1* | 8/2017 | Jain | G16H 50/30 |
| 2017/0262445 A1* | 9/2017 | Jeon | H04L 67/22 |
| 2017/0315608 A1 | 11/2017 | Shanware | |
| 2017/0316780 A1* | 11/2017 | Lovitt | G10L 15/01 |
| 2017/0323328 A1* | 11/2017 | Nam | G06Q 30/0241 |
| 2017/0330237 A1* | 11/2017 | Canceri | G06K 9/6218 |
| 2017/0364484 A1* | 12/2017 | Hayes | G06F 17/214 |
| 2017/0371496 A1* | 12/2017 | Denoue | G06F 3/0481 |
| 2018/0018933 A1* | 1/2018 | Rehmeyer | G06F 3/011 |
| 2018/0040019 A1* | 2/2018 | Gavlovski | G06F 16/24578 |
| 2018/0040323 A1* | 2/2018 | Lesso | G10L 17/04 |
| 2018/0060376 A1* | 3/2018 | Mao | G06Q 30/0276 |
| 2018/0063066 A1* | 3/2018 | Kumar | H04L 51/32 |
| 2018/0069914 A1* | 3/2018 | Abebe | H04N 21/439 |
| 2018/0136794 A1* | 5/2018 | Cassidy | G06F 3/04817 |
| 2018/0189837 A1* | 7/2018 | Panchaksharaiah | |
| | | | G06Q 30/0264 |
| 2018/0253753 A1* | 9/2018 | Chung | H04L 67/306 |
| 2018/0276712 A1* | 9/2018 | Lewis | G06Q 30/0255 |
| 2018/0285748 A1* | 10/2018 | Husain | G06Q 30/02 |
| 2018/0285984 A1* | 10/2018 | Ayachitula | G06Q 50/01 |
| 2018/0315094 A1* | 11/2018 | Ashoori | G06Q 30/0269 |
| 2018/0329672 A1* | 11/2018 | Sadak | H04M 1/0216 |
| 2019/0028413 A1* | 1/2019 | Lewis | G06Q 10/109 |
| 2019/0043095 A1* | 2/2019 | Grimaud | G06F 16/906 |
| 2019/0104201 A1* | 4/2019 | Bati | H04L 61/251 |
| 2019/0122185 A1* | 4/2019 | Koeppel | G06Q 20/327 |
| 2019/0130917 A1* | 5/2019 | Pogorelik | G06F 17/241 |
| 2019/0130919 A1* | 5/2019 | Lesso | G10L 17/20 |
| 2019/0149857 A1* | 5/2019 | Lo | H04N 21/43074 |
| | | | 709/219 |
| 2019/0205928 A1* | 7/2019 | Lee | H04L 51/34 |
| 2019/0278817 A1* | 9/2019 | Gross | G06Q 30/0623 |
| 2019/0363962 A1* | 11/2019 | Cimino | G06F 9/4843 |
| 2020/0082442 A1* | 3/2020 | Sotomayor | G06Q 30/0267 |
| 2020/0152206 A1* | 5/2020 | Shen | G10L 17/02 |
| 2020/0168222 A1* | 5/2020 | Saito | G10L 15/08 |

OTHER PUBLICATIONS

Ortiz, Amy, Boston Globe, for local Patriots fans, a seesaw of emotions, dated Jan. 24, 2016, downloaded from https://www.bostonglobe.com/metro/2016/01/24/for-local-pats-fans-seesaw-emotions/sGSfZhrkVkXGxniK9XmORL/story.html (Year: 2016).

Doenfeld, Bill, 20+ Emotion Recognition APIs That Will Leave You Impressed, and Concerned, dated May 29, 2016 and downloaded Jan. 15, 2020 from https://web.archive.org/web/20160529042447/http://nordicapis.com/20-emotion-recognition-apis-that-will-leave-you-impressed-and-concerned/—with header (Year: 2016).

Doerrfeld, Bill, 20+ Emotion Recognition APIs That Will Leave You Impressed, and Concerned, dated May 29, 2016 and downloaded Jan. 15, 2020 from https://web.archive.org/web/20160529042447/http://nordicapis.com/20-emotion-recognition-apis-that-will-leave-you-impressed-and-concerned/—without header (Year: 2016).

Pease, Allan and Barbara, The Definitive Book of Body Language, published by the New York Times on Sep. 24, 2006, downloaded Jan. 20, 2020 from https://www.nytimes.com/2006/09/24/books/chapters/0924-1st-peas.html (Year: 2006).

* cited by examiner

DYNAMIC STATEMENT CATEGORIZATION 210

COMPANY PREFERENCE 220

| Point of View | Desire | Acquisition | Descriptive | Location | Company | Descriptive | Location | Company |
|---|---|---|---|---|---|---|---|---|
| I | Rather | Buy | This | From | Company A | This | From | Company A |
| I'd | Want | Get | That | At | Company B | That | At | Company B |
| Me | Need | Costs More | Those | Over At | Company C | Those | Over At | Company C |
| You | Love | Cheaper | These | In | Company D | These | In | Company D |
| They | Craving | Tastes | Them | There | Company E | Them | There | Company E |

| I | Rather | Buy | That | From | Company A | Than | From | Company B |

COMPANY COMPARISON 230

| Company | Conjunction | Comparison | Descriptive | Company |
|---|---|---|---|---|
| Company A | Is | Better | This | Company A |
| Company B | Are | Way Better | That | Company B |
| Company C | Has | Cheaper | Those | Company C |
| Company D | The | Better for You | These | Company D |
| Company E | Of | Tastes Worse | Than | Company E |

| Company A | Is | Cheaper | Than | Company B |

COMPANY VALUE REFERENCE 240

| Descriptive | Conjunction | Comparison | Location | Company |
|---|---|---|---|---|
| This | Is | Better | From | Company A |
| That | Are | Way Better | At | Company B |
| Those | Has | Cheaper | Over At | Company C |
| These | The | Better for You | In | Company D |
| Than | Of | Tastes Worse | There | Company E |

| Those | Are | Better for You | From | Company A |

STATIC STATEMENT CATEGORIZATION 260

NEGATIVE FEEDBACK GENERALIZED — ADVERTISING CONTENT — 270

STATEMENT

I don't like this commercial
Why do they keep playing this commercial
I hate this ad
I don't like this ad
This commercial make me sick

POSITIVE FEEDBACK GENERALIZED — ADVERTISING CONTENT — 280

STATEMENT

I like this commercial
I love this commercial
This ad makes me laugh
This commercial is so funny
You have to watch this commercial

FIG. 2

TARGETED CONTENT BASED ON USER REACTIONS

TECHNICAL FIELD

The present disclosure relates to detecting reactions of a user to media. In particular, the present disclosure relates to targeting content based on user reactions.

BACKGROUND

Computer processing of speech audio can be used to determine a meaning of speech. Various different actions can be taken according to the determined meaning of the processed speech audio.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example of dynamic statement categorization and an example of static statement categorization during natural language processing, in accordance with one or more embodiments;

DETAILED DESCRIPTION

Figure 1:
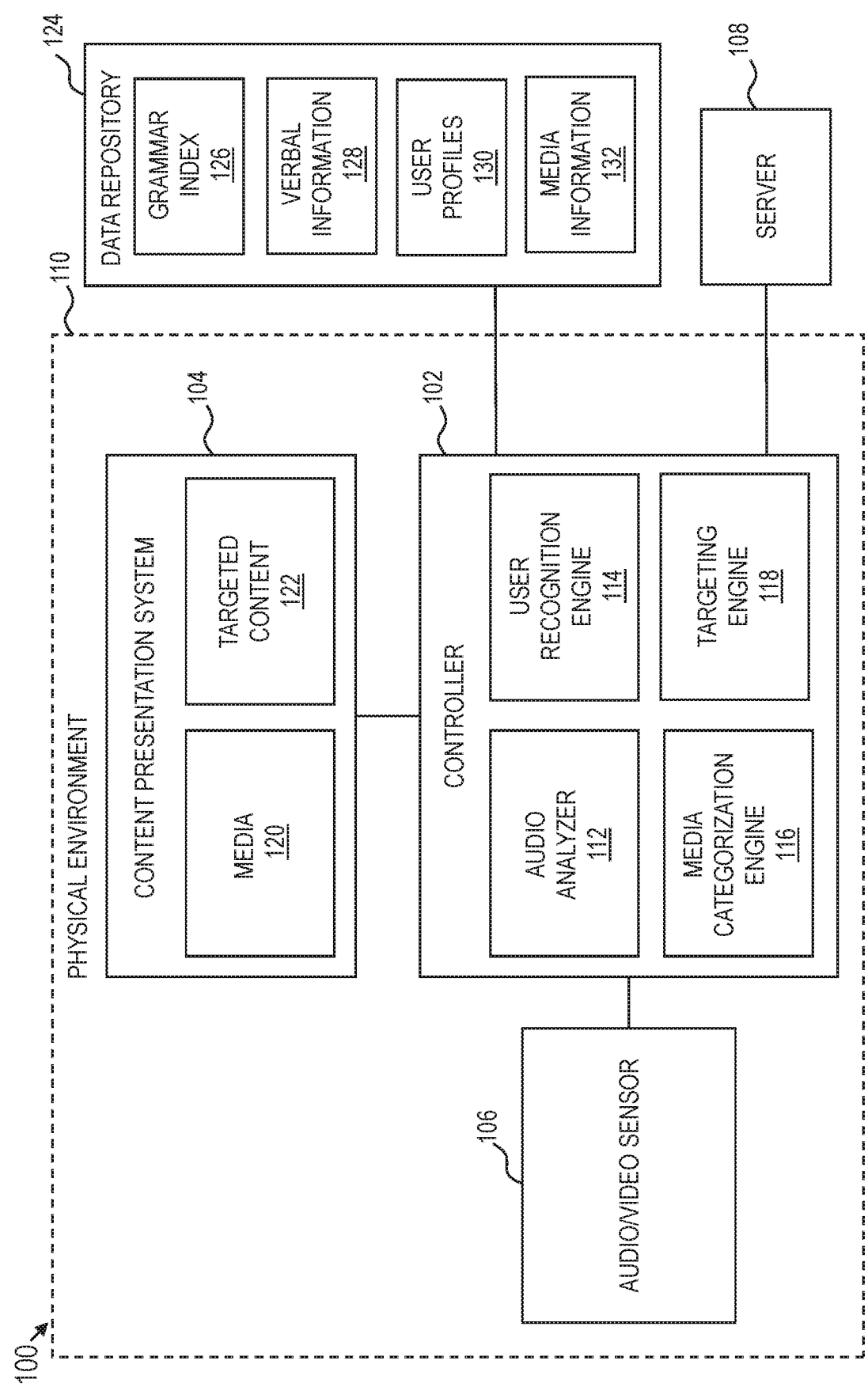
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

In various embodiments, detected speech of a user that is watching a television program or movie may be analyzed by a computer system to determine a reaction of the user in response to the television program or movie. The detected speech may be analyzed to determine various types of information regarding the speech in relation to the content of the television program or movie. For example, an emotional state, sentiment, or reaction to the content may be stored in relation to the content. The reaction may be time-synchronized with the content, so that a user's reaction may be correlated with a particular scene in the content. The information regarding the detected speech may indicate a scene or a characteristic of the scene that makes the user laugh or feel excited or happy, for example. In addition, a user's speech regarding the user's likes and dislikes, for example, in relation to the content presented to the user, may be understood and used for targeting different content to be presented to the user according to the user's preferences.

One or more embodiments include identifying content displayed by a content presentation system associated with a physical environment, detecting an audible expression of a user located within the physical environment, and storing information associated with the audible expression in relation to the displayed content. The audible expression may include a verbal statement or non-verbal expression, e.g., a laugh, a cry, a moan, a clap, a foot stomp, or other non-verbal audible expression. The content presentation system may include a television or video screen that provides visual presentations or entertainment to one or more people. The content presentation system may also include an audio speaker that provides audio presentations or entertainment to the one or more people, alone or in combination with the television or video screen. The audible expression of the user may be detected by using one or more microphones, either alone or in combination with a video camera that captures an image of the user. The audible expression may be captured contemporaneously with the user viewing and/or listening to the content presented by the content presentation system. Speech recognition may be performed on the detected audible expression to determine the information associated with the audible expression. The information may include a meaning of a verbal statement included in the audible expression, a user sentiment, or a user emotion mapped to the audible expression.

One or more embodiments also include selecting targeted content based on the information associated with the audible expression or the user sentiment. One or more embodiments may also include determining a user preference based on the information associated with the audible expression and selecting targeted content based on the user preference. The user preference may be further based on the identified content displayed by the content presentation system. The targeted content may be transmitted to the content presentation system. The targeted content may include an advertisement or an audio/video program such as a television show or movie. Transmitting the targeted content may include controlling the content presentation system to present or display the targeted content.

Determining the user preference may include parsing words included in the information associated with the audible expression, determining a name about which the user has a preference by comparing the parsed words with an index of names, and determining the user preference regarding the determined name according to conjunction and comparison operators included in the parsed words.

The audible expression may include laughter. Detecting the audible expression as including laughter may be performed by identifying an audio pattern correlated with laughter in the audible expression.

One or more embodiments may also include performing facial recognition or voice recognition to identify the user. Identification of the user may also be performed according to a detected mobile payment system. Information associated with the audible expression may be stored in relation to the displayed content while also associated with the identified user. A user sentiment may be computed based on the detected audible expression, and the user sentiment may be stored in association with the identified user.

One or more embodiments may also include detecting a plurality of audible expressions of the user at a plurality of points in time, and storing a time-indexed stream of information associated with the plurality of audible expressions in relation to points in time of the displayed content. For example, the user's sentiments toward particular time points in the displayed content, e.g., products, companies, actors, scenes of a show, etc., may be stored. How the user's sentiments toward products, companies, actors, scenes, etc., change over time as the displayed content is presented may also be tracked and stored.

One or more embodiments described in this Specification and/or recited in the claims may not be included in this General Overview section.

2. ARCHITECTURAL OVERVIEW

FIG. 1 illustrates a system 100, in accordance with one or more embodiments. As illustrated in FIG. 1, the system 100 includes a controller 102, a content presentation system 104, an audio/video sensor 106, a server 108, and a data repository 124. In various embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or digital devices. Multiple components may be combined into one application and/or digital device. Operations described with respect to one component may instead be performed by another component.

The term "digital device" generally refers to any hardware device that includes a processor. A digital device may refer to a physical device executing an application or a virtual machine. Examples of digital devices include a computer, a tablet, a laptop, a desktop, a netbook, a server, a mainframe, a hardware router, a hardware switch, a hardware firewall, a hardware network address translator (NAT), a hardware load balancer, a television, a monitor, a content receiver, a set-top box, a video gaming console, a printer, a cellular phone, a mobile handset, a smartphone, a personal digital assistant ("PDA"), a wireless receiver and/or transmitter, a base station, a communication management device, a controller, an access point, a client device, a streaming stick, a Bluetooth enabled device, a Bluetooth Low Energy (BLE) transmitter, and/or a controller. Two or more components within the system 100 may be communicatively coupled via a local area network, a wide area network, the Internet, an intranet, a cellular network, and/or combinations thereof. A digital device may also be referred to as a "machine".

In one or more embodiments, a system for detecting audible expressions associated with content displayed in a physical environment refers to hardware and/or software configured to perform operations described herein for a system for detecting audible expressions associated with content displayed in a physical environment. Examples of operations for a system for detecting audible expressions associated with content displayed in a physical environment are described below with reference to FIG. 3.

In one or more embodiments, an interface includes hardware and/or software configured to facilitate communications between a user in the physical environment 110 and the controller 102. The interface may render user interface elements via the content presentation system 104 and receive input via the audio/video sensor 106 or other input hardware such as a keyboard, a mouse, a touchpad, etc. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

Some components of the system 100 may be within a same physical environment 110 while other components may be outside of the physical environment 110. In the example of system 100 as illustrated in FIG. 1, the controller 102, the content presentation system 104, and the audio/video sensor 106 are included within the physical environment 110. In various embodiments, portions of the controller 102 may be located within the physical environment 110 while other portions of the controller 102 are not located within the physical environment 110, or the controller 102 may be fully located outside the physical environment 110. The physical environment 110 may include any physical space where the content presentation system 104 may be located. Examples of the physical environment 110 include, but are not limited to, a room in a home, a classroom, an office, a hallway, a movie theater, an event venue, a bar, etc.

In an embodiment, the data repository 124 is any type of storage unit and/or device (e.g., a file system, database, collection of tables, or any other storage mechanism) for storing data. Further, the data repository 124 may include multiple different storage units and/or devices, local or remote to the controller 102. The data repository 124 may include a hard disk drive (HDD), solid state drive (SSD), thumb drive, dynamic random access memory (DRAM), static random access memory (SRAM), or other data storage system. The multiple different storage units and/or devices may or may not be of the same type or located at the same physical site. Further, the data repository 124 may be implemented or may execute on the same computing system as the controller 102 or the server 108. Alternatively or additionally, the data repository 124 may be implemented or executed on a computing system separate from the controller 102 or the server 108. The data repository 124 may be communicatively coupled to the controller 102 via a direct connection or via a network. Storage of information described as being stored within the data repository 124 may be implemented across any components within the system 100. However, this information is illustrated within the data repository 124 in FIG. 1 for purposes of clarity and explanation.

In an embodiment, the content presentation system 104 presents content to one or more users in the physical environment 110. The content presentation system 104 may include hardware and/or software to present content. The content presentation system 104 may include any device and/or application that causes the presentation of content. The content presentation system 104 may display visual content and/or play audio content. When the content presentation system 104 is discussed herein as displaying content, the content presentation system 104 should also be considered to alternatively or additionally be playing content or presenting content, whether audio, video, or both audio and video content simultaneously. The content presentation system 104 may include a television or video monitor, e.g., a liquid crystal display (LCD), light emitting diode (LED) display, plasma display, cathode ray tube (CRT) display, or video projection system that provides visual presentations or entertainment to one or more people. The content presentation system 104 may include an electronic device such as a home entertainment system, television, personal computer system, laptop computer, smart phone, personal digital assistant (PDA), or tablet computing device. The content presentation system 104 may include a video projection system of a movie theater or other venue that provides visual presentations or entertainment simultaneously to groups of people within a same physical environment. The content presentation system 104 may include a cable set-top box that transmits a media stream to a television or video monitor for display. The content presentation system 104 may include a desktop computer which receives a media stream from a web server (e.g., the server 108) and displays the media stream on a video monitor. The content presentation system 104 may include a USB streaming stick which receives the content wirelessly via an access point and displays the content on a video monitor. The content presentation system 104 may include a radio, audio receiver, or audio speaker which plays audio content. The content presentation system 104 may include an audio stream stick which receives an audio stream via an access point and streams the audio (e.g., music) via a speaker system.

The content presented by the content presentation system 104 may include media 120. The media 120 may include video media, audio media, and/or audio/video media. The media 120 may include pre-programmed and pre-determined media, for example, a regularly scheduled television program or an on-demand program provided by the server 108 via the controller 102. The media 120 may include a locally provided program, for example, a movie or other audio/visual program provided via a DVD or Blu-Ray disc or via a digital video recorder (DVR). The content presented by the content presentation system 104 may also include targeted content 122. The targeted content 122 may include video media, audio media, and/or audio/visual media. The targeted content 122 may include dynamically provided media, provided by the controller 102 and/or the server 108 according to feedback received from the one or more users in the physical environment 110 by the controller 102. The feedback received from the one or more users in the physical environment 110 may be in response to the media 120 and/or the targeted content 122 presented by the content presentation system 104.

In an embodiment, the audio/video sensor 106 may include one or more microphones, digital cameras, and/or video cameras, for example, including a transducer, a dynamic microphone, a condenser microphone, a piezoelectric microphone, an electronic image sensor, and/or a charge coupled device (CCD) image sensor. The audio/video sensor 106 may also include an ultrasonic sensor or other device configured to detect a distance between a person or object in the physical environment 110 and the audio/video sensor 106.

The audio/video sensor 106 may include a plurality of microphones arranged to detect a stereo soundscape or a surround sound soundscape. The audio/video sensor 106 may detect an audio soundscape of the physical environment 110 including the one or more users in the physical environment 110. The audio/video sensor 106 may utilize the plurality of microphones to pinpoint sources of audio within the physical environment 110. For example, a microphone array (e.g., four microphones spaced apart in a horizontally-oriented linear array) may be utilized in conjunction with audio processing to separately identify and process individual audio sources (e.g., different people speaking) within the physical environment 110 when the individual audio sources simultaneously generate separate audio expressions.

The audio/video sensor 106 may be configured to detect an image within a visible light spectrum and/or an image within an infrared light spectrum. The audio/video sensor 106 may detect sounds, for example, audible expressions including but not limited to verbal statements and expressions, laughing, giggling, booing, shouting, yelling, screaming, grunting, moaning, crying, clapping, and/or foot stomping of the one or more users in the physical environment 110. In various embodiments, multiple audio/video sensors 106 may be communicatively coupled together, coordinated with one another, and/or coupled with the controller 102 to facilitate detection of images and/or audio of multiple users within the physical environment 110.

In an embodiment, the controller 102 includes a digital device communicatively coupled with the content presentation system 104, the audio/video sensor 106, the data repository 124, and the server 108. The controller 102 receives the content from the server 108 and transmits the content to the content presentation system 104. The controller may also or alternatively receive the content from a local content source, such as a disk drive, DVD player, Blu-Ray player, DVR, memory stick, etc. The controller 102 also receives information from the audio/video sensor 106 regarding audio and/or images detected in the physical environment 110. The controller 102 may control the content provided to the content presentation system 104 according to the information received from the audio/video sensor 106.

In an embodiment, the controller 102 includes a user recognition engine 114 that recognizes a user in the physical environment 110 according to one or more distinguishing characteristics of the user. The user recognition engine 114 may be configured to perform facial recognition to recognize and identify a user according to facial characteristics of the user. In conjunction with an audio analyzer 112 also included by the controller 102, the user recognition engine 114 may be configured to perform voice recognition to recognize and identify a user according to vocal characteristics of the user. When the user recognition engine 114 first encounters a specific user, the user recognition engine 114 may characterize the user's face and/or voice and store a characteristic of the user's face and/or voice in user profiles 130 of the data repository 124 along with a unique identifier for the specific user. The characteristic may include a physical characteristic useful for uniquely identifying the user, as well as information derivable from an image of the user's face, e.g., an age or age range of the user, a likely gender of the user, and/or whether the user wears glasses. Likewise, the characteristic may include a vocal characteristic useful for uniquely identifying the user, as well as information derivable from the user's voice, e.g., an age or age range of the user, a likely gender of the user, a native language of the user, a language accent of the user, and/or a likely geographic region of origin of the user based on the user's accent. For example, an age or age range of a user may be detected according to a frequency range of a user's voice, e.g., a child's voice may be detected as having a higher pitch than an adult's voice. As another example, vocal qualities of a voice, e.g., frequency content, may also be used to detect whether the speaker is most likely male or female. Examples of language accents include English (Australia), English (Belize), English (Canada), English (Caribbean), English (United Kingdom), English (Ireland), English (Jamaica), English (New Zealand), English (Republic of the Philippines), English (Trinidad and Tobago), English (United States), English (South Africa), English (Zimbabwe), etc. A list of ISO language dialects is provided at http://www.lingoes.net/en/translator/langcode.htm. The current list is provided in the following Table 1.

TABLE 1

ISO Language Code Table

| Code | Language | Code | Language | Code | Language |
|---|---|---|---|---|---|
| af | Afrikaans | fo-FO | Faroese (Faroe Islands) | se-FI | Sami (Skolt) (Finland) |
| af-ZA | Afrikaans (South Africa) | fr | French | se-FI | Sami (Inari) (Finland) |
| ar | Arabic | fr-BE | French (Belgium) | se-NO | Sami (Northern) (Norway) |
| ar-AE | Arabic (U.A.E.) | fr-CA | French (Canada) | se-NO | Sami (Lule) (Norway) |
| ar-BH | Arabic (Bahrain) | fr-CH | French (Switzerland) | se-NO | Sami (Southern) (Norway) |
| ar-DZ | Arabic (Algeria) | fr-FR | French (France) | se-SE | Sami (Northern) (Sweden) |
| ar-EG | Arabic (Egypt) | fr-LU | French (Luxembourg) | se-SE | Sami (Lule) (Sweden) |
| ar-IQ | Arabic (Iraq) | fr-MC | French (Principality of Monaco) | se-SE | Sami (Southern) (Sweden) |
| ar-JO | Arabic (Jordan) | gl | Galician | sk | Slovak |
| ar-KW | Arabic (Kuwait) | gl-ES | Galician (Spain) | sk-SK | Slovak (Slovakia) |
| ar-LB | Arabic (Lebanon) | gu | Gujarati | sl | Slovenian |
| ar-LY | Arabic (Libya) | gu-IN | Gujarati (India) | sl-SI | Slovenian (Slovenia) |
| ar-MA | Arabic (Morocco) | he | Hebrew | sq | Albanian |
| ar-OM | Arabic (Oman) | he-IL | Hebrew (Israel) | sq-AL | Albanian (Albania) |
| ar-QA | Arabic (Qatar) | hi | Hindi | sr-BA | Serbian (Latin) (Bosnia and Herzegovina) |
| ar-SA | Arabic (Saudi Arabia) | hi-IN | Hindi (India) | sr-BA | Serbian (Cyrillic) (Bosnia and Herzegovina) |
| ar-SY | Arabic (Syria) | hr | Croatian | sr-SP | Serbian (Latin) (Serbia and Montenegro) |
| ar-TN | Arabic (Tunisia) | hr-BA | Croatian (Bosnia and Herzegovina) | sr-SP | Serbian (Cyrillic) (Serbia and Montenegro) |
| ar-YE | Arabic (Yemen) | hr-HR | Croatian (Croatia) | sv | Swedish |
| az | Azeri (Latin) | hu | Hungarian | sv-FI | Swedish (Finland) |
| az-AZ | Azeri (Latin) (Azerbaijan) | hu-HU | Hungarian (Hungary) | sv-SE | Swedish (Sweden) |
| az-AZ | Azeri (Cyrillic) (Azerbaijan) | hy | Armenian | sw | Swahili |
| be | Belarusian | hy-AM | Armenian (Armenia) | sw-KE | Swahili (Kenya) |
| be-BY | Belarusian (Belarus) | id | Indonesian | syr | Syriac |
| bg | Bulgarian | id-ID | Indonesian (Indonesia) | syr-SY | Syriac (Syria) |
| bg-BG | Bulgarian (Bulgaria) | is | Icelandic | ta | Tamil |

TABLE 1-continued

ISO Language Code Table

| Code | Language | Code | Language | Code | Language |
|---|---|---|---|---|---|
| bs-BA | Bosnian (Bosnia and Herzegovina) | is-IS | Icelandic (Iceland) | ta-IN | Tamil (India) |
| ca | Catalan | it | Italian | te | Telugu |
| ca-ES | Catalan (Spain) | it-CH | Italian (Switzerland) | te-IN | Telugu (India) |
| cs | Czech | it-IT | Italian (Italy) | th | Thai |
| cs-CZ | Czech (Czech Republic) | ja | Japanese | th-TH | Thai (Thailand) |
| cy | Welsh | j a-JP | Japanese (Japan) | tl | Tagalog |
| cy-GB | Welsh (United Kingdom) | ka | Georgian | tl-PH | Tagalog (Philippines) |
| da | Danish | ka-GE | Georgian (Georgia) | tn | Tswana |
| da-DK | Danish (Denmark) | kk | Kazakh | tn-ZA | Tswana (South Africa) |
| de | German | kk-KZ | Kazakh (Kazakhstan) | tr | Turkish |
| de-AT | German (Austria) | kn | Kannada | tr-TR | Turkish (Turkey) |
| de-CH | German (Switzerland) | kn-IN | Kannada (India) | tt | Tatar |
| de-DE | German (Germany) | ko | Korean | tt-RU | Tatar (Russia) |
| de-LI | German (Liechtenstein) | ko-KR | Korean (Korea) | ts | Tsonga |
| de-LU | German (Luxembourg) | kok | Konkani | uk | Ukrainian |
| dv | Divehi | kok-IN | Konkani (India) | uk-UA | Ukrainian (Ukraine) |
| dv-MV | Divehi (Maldives) | ky | Kyrgyz | ur | Urdu |
| el | Greek | ky-KG | Kyrgyz (Kyrgyzstan) | ur-PK | Urdu (Islamic Republic of Pakistan) |
| el-GR | Greek (Greece) | lt | Lithuanian | uz | Uzbek (Latin) |
| en | English | lt-LT | Lithuanian (Lithuania) | uz-UZ | Uzbek (Latin) (Uzbekistan) |
| en-AU | English (Australia) | lv | Latvian | uz-UZ | Uzbek (Cyrillic) (Uzbekistan) |
| en-BZ | English (Belize) | lv-LV | Latvian (Latvia) | vi | Vietnamese |
| en-CA | English (Canada) | mi | Maori | vi-VN | Vietnamese (Viet Nam) |
| en-CB | English (Caribbean) | mi-NZ | Maori (New Zealand) | xh | Xhosa |
| en-GB | English (United Kingdom) | mk | FYRO Macedonian | xh-ZA | Xhosa (South Africa) |
| en-IE | English (Ireland) | mk-MK | FYRO Macedonian (Former Yugoslav Republic of Macedonia) | zh | Chinese |
| en-JM | English (Jamaica) | mn | Mongolian | zh-CN | Chinese (S) |
| en-NZ | English (New Zealand) | mn-MN | Mongolian (Mongolia) | zh-HK | Chinese (Hong Kong) |
| en-PH | English (Republic of the Philippines) | mr | Marathi | zh-MO | Chinese (Macau) |

TABLE 1-continued

ISO Language Code Table

| Code | Language | Code | Language | Code | Language |
|---|---|---|---|---|---|
| en-TT | English (Trinidad and Tobago) | mr-IN | Marathi (India) | zh-SG | Chinese (Singapore) |
| en-US | English (United States) | ms | Malay | zh-TW | Chinese (T) |
| en-ZA | English (South Africa) | ms-BN | Malay (Brunei Darussalam) | zu | Zulu |
| en-ZW | English (Zimbabwe) | ms-MY | Malay (Malaysia) | zu-ZA | Zulu (South Africa) |
| eo | Esperanto | mt | Maltese | | |
| es | Spanish | mt-MT | Maltese (Malta) | | |
| es-AR | Spanish (Argentina) | nb | Norwegian (Bokm?l) | | |
| es-BO | Spanish (Bolivia) | nb-NO | Norwegian (Bokm?l) (Norway) | | |
| es-CL | Spanish (Chile) | nl | Dutch | | |
| es-CO | Spanish (Colombia) | nl-BE | Dutch (Belgium) | | |
| es-CR | Spanish (Costa Rica) | nl-NL | Dutch (Netherlands) | | |
| es-DO | Spanish (Dominican Republic) | nn-NO | Norwegian (Nynorsk) (Norway) | | |
| es-EC | Spanish (Ecuador) | ns | Northern Sotho | | |
| es-ES | Spanish (Castilian) | ns-ZA | Northern Sotho (South Africa) | | |
| es-ES | Spanish (Spain) | pa | Punjabi | | |
| es-GT | Spanish (Guatemala) | pa-IN | Punjabi (India) | | |
| es-HN | Spanish (Honduras) | pl | Polish | | |
| es-MX | Spanish (Mexico) | pl-PL | Polish (Poland) | | |
| es-NI | Spanish (Nicaragua) | ps | Pashto | | |
| es-PA | Spanish (Panama) | ps-AR | Pashto (Afghanistan) | | |
| es-PE | Spanish (Peru) | pt | Portuguese | | |
| es-PR | Spanish (Puerto Rico) | pt-BR | Portuguese (Brazil) | | |
| es-PY | Spanish (Paraguay) | pt-PT | Portuguese (Portugal) | | |
| es-SV | Spanish (El Salvador) | qu | Quechua | | |
| es-UY | Spanish (Uruguay) | qu-BO | Quechua (Bolivia) | | |
| es-VE | Spanish (Venezuela) | qu-EC | Quechua (Ecuador) | | |
| et | Estonian | qu-PE | Quechua (Peru) | | |
| et-EE | Estonian (Estonia) | ro | Romanian | | |
| eu | Basque | ro-RO | Romanian (Romania) | | |
| eu-ES | Basque (Spain) | ru | Russian | | |
| fa | Farsi | ru-RU | Russian (Russia) | | |
| fa-IR | Farsi (Iran) | sa | Sanskrit | | |
| fi | Finnish | sa-IN | Sanskrit (India) | | |
| fi-FI | Finnish (Finland) | se | Sami (Northern) | | |
| fo | Faroese | se-FI | Sami (Northern) (Finland) | | |

After storing a characteristic of the user's face and/or voice in user profiles 130 of the data repository 124 along with a unique identifier for the specific user, each time the user recognition engine 114 encounters a previously characterized user in the physical environment 110, the user recognition engine 114 may use the user profiles 130 to recognize and identify the user as being in the physical environment 110. The controller 102 may also store other information pertaining to the users in the user profiles 130, for example, preferences for each of the users identified, for example, which types of programming each user prefers, which types of products each user prefers, age of the users, gender of the users, and other demographic and preference information for each of the users in the user profiles 130. In various embodiments, multiple user recognition engines 114 may be communicatively coupled together and/or coordinated with one another to facilitate recognition and detection of multiple users within the physical environment 110.

In various embodiments, the user recognition engine 114 may also include a Bluetooth sensor and/or a WiFi sensor that determines an identity of a mobile device in the physical environment 110 corresponding to one or more users in the physical environment. Using data stored with reference to users in the user profiles 130 in combination with information provided by the Bluetooth and/or WiFi sensors, the user recognition engine 114 may recognize one or more users located within the physical environment 110. For example, when a Bluetooth ID associated with a particular user in the user profiles 130 is detected, the user recognition engine 114 may determine that one of the users detected in the physical environment 110 is the user associated with the Bluetooth ID in the user profiles 130. Furthermore, using the Bluetooth ID and/or WiFi ID associated with a user located within the physical environment 110, the controller 102 may communicate directly with the user via the detected mobile device(s) to gather more specific feedback regarding the media 120 and/or targeted content 122 presented to the user by the content presentation system 110. The direct communication via the mobile device may include texting, email, and/or communication via a special purpose app located on the mobile device.

In various embodiments, the user recognition engine 114 may detect a mobile payment system, e.g., via a near field communication (NFC) sensor or a Bluetooth or WiFi sensor. The mobile payment system may include a mobile device, e.g., a cellular telephone, that executes an application for making a payment. The payment may be in any currency, including but not limited to real currency, physical currency, digital currency, cryptocurrency, or electronic currency. A mobile payment system may refer to a credit card or other physical payment component which may be detected by the user recognition engine 114 when the credit card or other physical payment component is used to make a payment. The credit card or other physical payment component may be stored or implemented directly on or separately from the mobile device. The user recognition engine 114 may identify a user based on an association between the user and the detected mobile payment system.

In various embodiments, the user recognition engine 114 may detect an electronic card of a user. The user recognition engine 114 may identify a user based on an association between the user and the detected electronic card. Examples of electronic cards include, but are not limited to, electronic identity documents, keycards, and electronic key smartcards. Electronic cards may refer to or include a mechanical holecard, barcodes, magnetic stripes, Wiegand wire embedded cards, smart card (e.g., embedded with a read/write electronic microchip), and RFID proximity cards.

In an embodiment, the audio analyzer 112 may analyze the information received from the audio/video sensor 106 to recognize a verbal statement within an audible expression including one or more words according to a grammar index 126 in the data repository 124 and/or to be trained to recognize a verbal statement to be stored in the grammar index 126 for verbal statement analyses. The audio analyzer 112 may perform grammar processing to recognize the verbal statement. The audio analyzer 112 may also analyze and recognize audible expressions that are not recognized as verbal statements, e.g., laughter, giggling, screaming, shouting, crying, yelling, grunting, moaning, booing, clapping, foot stomping, etc. The audio analyzer 112 may analyze audible expressions performed by a user while in front of the content presentation system 104 having large screens, e.g., movie theaters, medium-sized screens, e.g., television sets, and/or small screens, e.g., smartphone screens. In various embodiments, multiple audio analyzers 112 may be communicatively coupled together and/or coordinated with one another to facilitate recognition and analysis of audible expressions performed by multiple users within the physical environment 110.

The audio analyzer 112 may process audio received from the audio/video sensor 106 to separately identify and process individual sources of audible expressions in the physical environment 110. The audio analyzer 112 may use one or more digital signal processing methods, e.g., beamforming or synthetic aperture audio processing, to separately identify and process individual sources of audible expressions in the physical environment 110. The audio analyzer 112 may identify different users associated with different audible expressions received simultaneously by the audio/video sensor 106, for example, by voice recognition, face recognition, and/or recognition of a personal electronic device on the users' person. The audio analyzer 112 may process a stream of audible expressions from each of the individual sources separately and assign each processed stream to the corresponding identified user for storage of related information in the data repository 124. By identifying and processing the stream of audible expressions from each of the individual sources separately, the audio analyzer 112 may avoid blending words from different people in the physical environment 110 together. For example, a first person may say a word and a second person seated next to the first person may say a different word than the first person at the same time. The audio analyzer 112 may then recognize and assign the correct word to the audible expression stream associated with each respective person. By keeping the audible expression streams of each of the people in the physical environment 110 separate, the audio analyzer 112 may perform grammar processing on the verbal expressions of each of the people separately.

The audio analyzer 112 may perform voice recognition on each stream of audible expressions to identify a user associated with each stream. The voice recognition may use machine learning to improve voice recognition for each user over time. Each time a recognized user says something, the audio analyzer 112 may use machine learning to update data associated with the recognized user in a database stored in the data repository 124 to train the audio analyzer 112 to better recognize the recognized user when analyzing audible expressions picked up by the audio/video sensor 106. The training of the audio analyzer 112 to better recognize the recognized user may also improve the audio analyzer 112's separation of simultaneous streams of audible expressions emanating from different users in the physical environment 110.

The audio analyzer 112 may perform speech recognition on audio received from the audio/video sensor 106. The audio may include an audible expressions. The audio analyzer 112 may determine information associated with the audible expressions, for example, a meaning of the audible expressions, according to the speech recognition of a verbal statement within the audible expression. A confidence level may be determined for performing the speech recognition. For example, a confidence level of 75% or greater may be a threshold for a candidate audible expression to be considered as recognized according to speech recognition by the audio analyzer 112. The confidence level of a candidate audible expression may be determined according to various machine learning factors, e.g., correlation values between the machine learned audible expression and the information of the audio/video sensor 106 analyzed by the audio analyzer 112.

The audio analyzer 112 may be trained to recognize an audible expression of a user, and then store information pertaining to the audible expression in the data repository 124. The information pertaining to the audible expression may include audio characteristics that define the audible expression, a meaning of the audible expression, actions to be taken by the controller 102 when the audible expression is recognized, and other information relevant to the audible expression. The training may be performed by storing an audio pattern associated with the detected audible expression in a database within the data repository 124 and analyzing the stored audio pattern (e.g., that of a user speaking or making other audible expressions) in the data repository 124. Machine learning may be performed on the audio pattern to associate the analyzed audio with a specific trained audible expression. Machine learning may recognize words and connect recognized words together from a full stream of audible expressions stored in the database to determine a meaning of the recognized words connected together. A meaning of a sentence may be determined after the sentence is complete, so the machine learning may be performed after a full stream of audible expressions is determined to be complete and stored in full in the data repository 124.

A meaning may also be assigned to the trained audible expression when the audible expression is not a word, e.g., laughter may be trained and associated with a sentiment of happiness. For example, in recognizing laughter, the audio analyzer 112 may identify audio or vocal patterns correlated with laughter in the analyzed audible expression, such as a repetitive rising and dropping of a volume of a voice as typically present in "ha ha ha ha." The analysis of the audio patterns may identify peaks and valleys in the volume of the audible expression in a pattern correlated with laughter. A sound of a consonant "a" may be recognized via speech recognition repeatedly with short breaks in between the repeated recognized consonants "a." According to the analysis, the audio analyzer 112 may determine that the audible expression is laughter according to a confidence threshold, e.g., 75% or better.

A plurality of different languages and/or dialects may be imported into the data repository 124 so that the audio analyzer 112 may recognize verbal statements in different languages. Words within one or more different languages may be imported into the grammar index 126 along with their respective meanings so that they may be used by the audio analyzer 112 to recognize verbal statements and parse verbal statements to determine their meaning so that the controller 102 may perform actions according to their meaning and/or stored information according to their meaning in the data repository 124.

The audio analyzer 112 may store information associated with the recognized or detected audible expression in verbal information 128 of the data repository 124. The information stored in the verbal information 128 may include a time that the audible expression is detected, metadata pertaining to the media 120 being presented to the user by the content presentation system 104 at the time the audible expression is detected, a meaning of the detected audible expression, and/or a user sentiment or emotion associated with the detected audible expression. The grammar index 126 may include a set of words or verbal statements trained for each individual user in the user profiles 130, so that a verbal statement is recognized by the audio analyzer 112 by both the audio analyzed from the information provided by the audio/video sensor 106 as well as the identity of the user generating the audible expression according to the user profiles 130. For example, a given word or verbal statement with a given meaning may be trained to correspond to different vocal characteristics for one user than a different user in the user profiles 130. Likewise, the verbal information 128 may also be keyed to the identity of the user that uttered the recognized audible expression.

To analyze verbal statements, the audio analyzer 112 may perform natural language processing on verbal statements received via the audio/video sensor 106. Using dynamic statement categorization, the audio analyzer 112 may listen for words that the audio analyzer 112 is trained to recognize, e.g., words that are stored in the grammar index 126. The words that the audio analyzer 112 is trained to recognize may be categorized as names, conjunctions, comparison operators, preference types, preference values, sentiments, etc. For example, the grammar index 126 may include the names of various products and companies. The grammar index 126 may also include preference types including "taste," "sound," "look," "smell," etc., and their equivalents. The grammar index 126 may also include comparison operators including "better," "worse," "more," "less," etc., and their equivalents. The grammar index 126 may also include preference values including "good," "great," "wonderful," "terrific," "bad," "awful," "funny," "boring," etc., and their equivalents. The grammar index 126 may also include conjunctions such as "and" and "or" and their equivalents. The grammar index 126 may also include sentiments including "happy," "sad," "excited," "love," "hate," etc., and their equivalents. The audio analyzer 112 may then recognize words in the grammar index 126 when they are detected in a verbal statement received from the audio/video sensor 106, and parse the verbal statement according to the types and meaning of the recognized words in the grammar index 126 to determine a meaning of the verbal statement. A name about which the user has a preference may be determined by comparing the parsed words with an index of names stored in the grammar index 126. A user preference regarding the name may be determined according to conjunction and comparison operators included in the parsed words stored in the grammar index 126. For example, when a statement such as "product-A tastes better than product-B" or "I'd rather buy this from company A than company B" is recognized and analyzed by the audio analyzer 112, it may be determined that the user uttering the verbal statement being analyzed prefers product A to product B or prefers buying a product shown by the content presentation system from company A over company B, respectively. The user's profile stored in the user profiles 130 within the data repository 124 may be updated to note that the user prefers product A over product B or company A over company B, respectively. As another example, when a statement such as "I hate this commercial" or "I love this show" is recognized and analyzed by the audio analyzer 112, it may be determined that the user uttering the verbal statement being analyzed has a sentiment of hate associated with the commercial or a sentiment of love associated with the show, respectively. The user's profile stored in the user profiles 130 within the data repository 124 may be updated to note the sentiment the user has associated with the commercial or show, respectively.

FIG. 2 illustrates an example of dynamic statement categorization 210 and an example of static statement categorization 260 during natural language processing, in accordance with one or more embodiments. During dynamic statement categorization 210, a statement including various words matched to different categories in different orders may be determined to have meanings according to the categories, their order, and the specific words matched to the categories. For example, the meanings may be represented as a company preference 220, a company comparison 230, or a company value reference 240.

For example, words in the sentence "I rather buy that from Company A than Company B" may be recognized and parsed, and then the words may be determined to be included in the categories "Point of View," "Desire," "Acquisition," "Descriptive," "Location," "Company," "Descriptive," "Location," and "Company," respectively. Examples of other words in each of these categories are also shown in FIG. 2, and many other words may also or alternatively be included in these categories in various embodiments. The sentence may be determined based on the sequence of the categories to specify a company preference 220. The parsed sentence may then be determined to mean that the user who spoke the analyzed sentence has a preference for Company A over Company B. The preference may then be stored in the data repository 124 in connection with the user and/or the content displayed by the content presentation system 104 when the analyzed sentence was received by the audio/video sensor 106.

As another example, words in the sentence "Company A is cheaper than Company B" may be recognized and parsed, and then the words may be determined to be included in the categories "Company," "Conjunction," "Comparison," "Descriptive," and "Company," respectively. Examples of other words in each of these categories are also shown in FIG. 2, and many other words may also or alternatively be included in these categories in various embodiments. The sentence may be determined based on the order of the categories to specify a company comparison 230. The parsed sentence may then be determined to mean that the user who spoke the analyzed sentence considers Company A to be cheaper than Company B. The comparison may then be stored in the data repository 124 in connection with the user and/or the content displayed by the content presentation system 104 when the analyzed sentence was received by the audio/video sensor 106.

As another example, words in the sentence "Those are better for you from Company A" may be recognized and parsed, and then the words may be determined to be included in the categories "Descriptive," "Conjunction," "Comparison," "Location," and "Company," respectively. Examples of other words in each of these categories are also shown in FIG. 2, and many other words may also or alternatively be included in these categories in various embodiments. The sentence may be determined based on the order of the categories to specify a company value reference 240. The parsed sentence may then be determined to mean that the user who spoke the analyzed sentence considers the products from Company A to be better for you. The value reference may then be stored in the data repository 124 in connection with the user and/or the content displayed by the content presentation system 104 when the analyzed sentence was received by the audio/video sensor 106.

In static statement categorization 260, a complete statement may be categorized as either generalized negative feedback 220 or positive feedback 280, e.g., regarding advertising content. Examples of statements categorized as negative feedback include "I don't like this commercial," "why do they keep playing this commercial," "I hate this ad," "I don't like this ad," and "this commercial make me sick." Examples of statements categorized as positive feedback include "I like this commercial," "I love this commercial," "this ad makes me laugh," "this commercial is so funny," and "you have to watch this commercial."

The audio analyzer 112 may also determine whether a detected user is engaged with the media or not. Particular audible expressions detected by the audio analyzer 112, a length of time in which an audible expression is continuously detected, a number of audible expressions detected over time, and/or an amount of elapsed time between detected audible expressions may be used to determine a level of user engagement with the presented media. Information pertaining to the detected audible expressions, e.g., the particular detected audible expressions, length of time an audible expression is continuously detected, number of audible expressions detected over time, and amount of elapsed time between detected audible expressions, may be stored in the data repository 124.

In an embodiment, the controller 102 includes a targeting engine 118 that uses the verbal information 128 as determined by the audio analyzer 112 to choose the targeted content 122 to transmit to the content presentation system 104. The targeting engine 118 may choose the targeted content 122 according to the emotional sentiment and/or preferences of one or more users detected in the physical environment 110. The targeted content 122 may include advertisements to be overlaid or injected into the middle of the media 120 or other media to be presented instead of the media 120. For example, the advertisements may be chosen based upon the emotional sentiment of the one or more users at the time the advertisement is to be shown or shortly before. One advertisement may be shown when the emotional sentiment is happy, whereas a different advertisement may be shown when the emotional sentiment is disinterested.

The targeting engine 118 may choose the targeted content 122 according to the user profiles 130 of one or more users detected in the physical environment 110. For example, the user profiles 130 may include product or company preferences of the users detected in the physical environment 110, e.g., that one user prefers a product A over a product B or company A over company B. The product or company preferences of the user may be used to determine advertisements to include in the targeted content 122. For example, if it is known from the user profiles 130 that the user prefers product A, an advertisement for product A may be chosen by the targeting engine 118 to be transmitted to the content presentation system 104 as the targeted content 122. If the verbal information 128 includes that the user has been talking about wanting to have some snacks of a certain type (e.g., potato chips), an advertisement for a product of the type that the user wants (e.g., potato chips) may be chosen by the targeting engine 118 to be transmitted to the content presentation system 104 as the targeted content 122. For example, a certain brand of the product type desired by the user may be chosen by the targeting engine 118 according to the user's user preferences.

The targeting engine 118 may determine if any user detected in the physical environment 110 is younger than a predetermined appropriate age for certain types of media, and refrain from including media inappropriate for any of the users detected in the physical environment 110 in the targeted content 122. For example, the targeting engine 118 may determine if any user detected in the physical environment 110 is younger than the legal age for drinking alcohol, and only include advertisements for alcohol in the targeted content 122 if there are no users detected in the physical environment 110 that are younger than the legal age.

In an embodiment, the controller 102 includes a media categorization engine 116 to categorize the media 120 and/or targeted content 122 (collectively, media). The media categorization engine 116 may analyze metadata of the media to determine a genre of the media, subject of the media, and/or scene information of the media vs. media play time. The data from categorization of the media may be stored in the media information 132 of the data repository 124 and/or together or in correlation with information pertaining to audible expressions detected by the audio analyzer 112 in the data repository 124.

3. DETECTING AUDIBLE EXPRESSIONS ASSOCIATED WITH CONTENT DISPLAYED IN A PHYSICAL ENVIRONMENT

Figure 3:
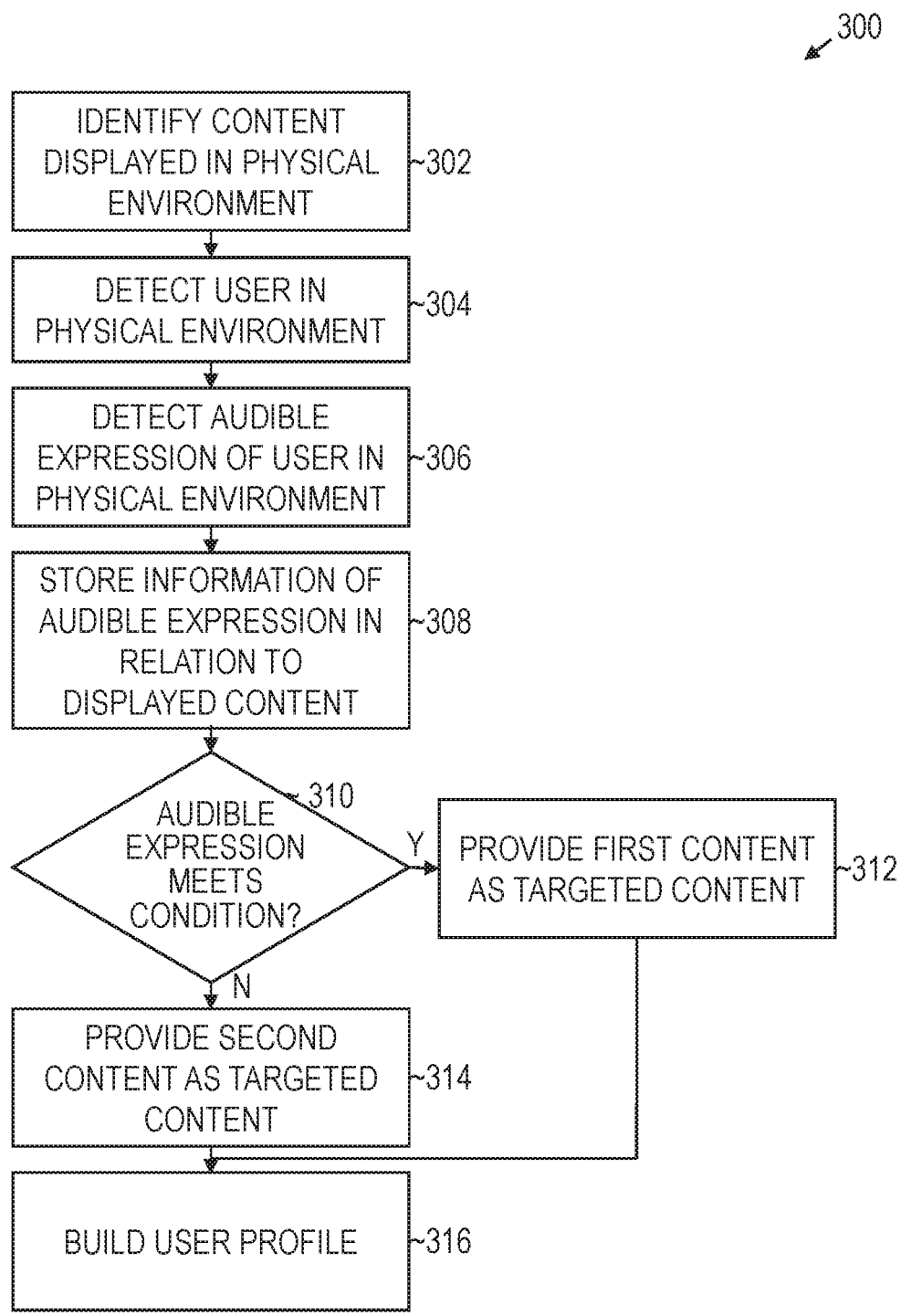
FIG. 3 illustrates an example set of operations for detecting an audible expression associated with content displayed in a physical environment, in accordance with one or more embodiments.

FIG. 3 illustrates an example set of operations for detecting an audible expression associated with content displayed in a physical environment, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. The operations illustrated in FIG. 3 may be performed repeatedly as long as content is displayed or presented by the content presentation system 104. Each detected audible expression may be associated with a snapshot of the content or metadata of the content presented at the point in time the audible expression is detected.

In an operation 302, the controller 102 may identify content displayed by the content presentation system 104 associated with the physical environment 110. The media categorization engine 116 may analyze metadata associated with the content displayed by the content presentation system 104 to identify the content and determine various characteristics of the content. Examples of the characteristics of the content include name of the content (e.g., television show or movie name, episode name, etc.), genre of the content (e.g., comedy, drama, sci-fi, sports, news, documentary, etc.), year the content was produced or first released, actors or hosts included in the content, source of the content, etc. The identity and characteristics of the content may be stored in the media information 132 of the data repository 124.

In an operation 304, the controller 102 may detect a user in the physical environment 110. The controller 102 may also identify the detected user and store or retrieve information pertaining to the detected user in the user profiles 130 of the data repository 124. The controller 102 may detect and/or identify the user via facial recognition, voice recognition, detection of a mobile payment system associated with the user, and/or detection of an electronic card of the user. The controller 102 may detect and/or identify numerous different users in the physical environment 110. The controller 102 may store and/or retrieve information pertaining to each of the detected users in the user profiles 130 of the data repository 124. The operation 304 may be performed at least in part by the user recognition engine 114.

Detection and/or identification of the numerous different users in the physical environment may also include detecting relationships between the numerous different users. For example, two different identified users may be determined to be related as parent and child, father and son, father and daughter, mother and son, mother and daughter, siblings, twins, a romantically involved couple, a married couple, etc. The determination of the relationship between the two different identified users may be according to information stored in the two different identified users' respective user profiles 130 of the data repository 124.

In an operation 306, the controller 102 may detect an audible expression of the one or more users in the physical environment 110. The controller 102 may analyze audio information provided by the audio/video sensor 106, e.g., electronic signals generated by microphones included in the audio/video sensor 106 according to sound sensed in the physical environment 110, to detect the audible expression according to a grammar index 126 stored in the data repository 124. If there are a plurality of users detected, an aggregate of the users' sentiment may be determined from their respective detected audible expressions, e.g., laughter or booing. For example, if a majority of the detected users are laughing, then an aggregate sentiment may be determined to be happiness. Likewise, if a majority of the detected users are booing, then an aggregate sentiment may be determined to be dislike. The aggregate of the users' sentiment may be detected by determining whether the detected audio overall is dominated by laughter or dominated by booing, for example, rather than identifying specific sentiments of specific users within the physical environment 110. The controller 102 may detect a plurality of audible expressions over a period of time during which the content, e.g., the media 120, is presented by the content presentation system 104. Each detected audible expression may be associated with a time point of the presented content. The operation 306 may be performed at least in part by the audio analyzer 112.

In an operation 308, the controller 102 may store information associated with the detected audible expression in relation to the displayed or presented content in the data repository 124. The controller 102 may store the information in the verbal information 128. The information may include a user emotion, e.g., a sentiment, mapped to the audible expression. The information may include a group sentiment when an audible expression of more than one user in the physical environment 110 is detected. For example, when a majority of the users in the physical environment 110 are detected as laughing, the sentiment of happiness may be recorded. A time during which the audible expression is detected, a time period during which the audible expression lasts, and/or spans of time separating detected audible expressions may also be recorded in the verbal information 128. A time-indexed stream of information associated with the detected audible expressions in relation to points in time of the presented content may be stored.

The controller 102 may store aggregated information of the audible expressions detected from the one or more users in the physical environment 110 in association with the displayed or presented content in the media information 132. For example, an aggregate sentiment of the users may be stored in association with specific time points of the presented content in the media information 132. For each time point at which an audible expression is detected by the audio analyzer 112, an aggregate sentiment as determined by the detected audible expression may be stored in the media information 132 pertaining to the respective time point of the presented content. Metadata associated with the presented content, and/or with the respective time points of the presented content, may also be stored in relation to the detected audible expressions in the media information 132.

In an operation 310, the controller 102 may determine whether the detected audible expressions or aggregate of detected audible expressions meets a predetermined condition. For example, the targeting engine 118 may determine whether the audible expressions detected by the audio analyzer 112 represent excitement or happiness (e.g., laughter).

In various embodiments, the controller 102 may also determine whether metadata associated with the one or more detected users meets a predetermined condition, for example, whether a relationship between different detected users meets a predetermined condition of a relationship, or whether an age or gender of one or more detected users meets a predetermined condition. The predetermined conditions in these examples may be that the user is not a child, that the detected users includes a male user, that the detected users includes a female user, that the detected users includes two users that are in a romantic relationship with one another or married to one another, that that the detected users includes a father/son, father/daughter, mother/son, or mother/daughter pair, etc.

In an operation 312, if the controller 102 determines in the operation 310 that the detected audible expression or aggregate of detected audible expressions meets the predetermined condition, the controller 102 may provide a first content (e.g., a first advertisement) to the content presentation system 104 as targeted content 122. For example, if the predetermined condition in the operation 310 is happiness in relation to metadata of the content presented by the content presentation system 104 at the moment in time when the audible expression is detected, then the targeting engine 118 may request content from the server 108 that is among one or more items of content to be displayed by the content presentation system 104 when the detected sentiment is happiness in relation to the content displayed at the moment in time when the sentiment of happiness is detected. The targeting engine 118 may then transmit the requested content to the content presentation system 104 as the targeted content 122. The first content may be overlaid onto or inserted in the middle of the content presented at the moment in time when the audible expression was detected. For example, the first content may be an advertisement that is played in a commercial break of the content presented at the moment in time when the audible expression was detected. The first content may alternatively replace the content presently presented, so that the first content is now presented in place of the content that had been presented at the moment in time when the audible expression was detected.

As another example, if the predetermined condition includes a predetermined relationship between two or more detected users, then the targeting engine 118 may request content from the server 108 that is among one or more items of content to be displayed by the content presentation system 104 when the two or more detected users have the predetermined relationship.

In an operation 314, if the controller 102 determines in the operation 310 that the detected audible expression or aggregate of detected audible expressions does not meet the predetermined condition, the controller 102 may provide a second content (e.g., a second advertisement) to the content presentation system 104 as targeted content 122. For example, if the predetermined condition in the operation 310 is happiness in relation to metadata of the content presented by the content presentation system 104 at the moment in time when the audible expression was detected, then the targeting engine 118 may request content from the server 108 that is among one or more items of content to be displayed by the content presentation system 104 when the detected sentiment is not happiness in relation to the content displayed at the moment in time when the sentiment of happiness is not detected. The targeting engine 118 may then transmit the requested content to the content presentation system 104 as the targeted content 122. The second content may be overlaid onto or inserted in the middle of the content presented at the moment in time when the audible expression was detected. For example, the second content may be an advertisement that is played in a commercial break of the content presented at the moment in time when the audible expression was detected. The second content may alternatively replace the content presented at the moment in time when the audible expression was detected, so that the second content is now presented in place of the content that had been presented at the moment in time when the audible expression was detected.

In an operation 316, a user profile associated with each detected user may be built or updated based upon the user's detected audible expression in association with the presented content. The user profile may be stored in the user profiles 130 of the data repository 124. The time the user's audible expression is detected may be correlated with metadata of the content presented by the content presentation system 104, e.g., information about the scene at the time the audible expression is detected, to store information regarding the user's likes and dislikes as determined by the detected audible expression. A sentiment of the specific user in reaction to the displayed content may be stored in the user's profile of the user profiles 130. For example, the user profile may indicate that a user likes a certain genre of movies or TV shows, e.g., comedies, but does not like another certain genre, e.g., horror movies. The user profile may also include deduced likes and dislikes regarding products featured in advertisements the user views and regarding which the system 100 detects audible expressions. Metadata pertaining to the displayed content, e.g., a genre of the displayed content or metadata regarding the specific time point of the displayed content during which the audible expression was generated by the user may be stored in the user's profile. For example, the sentiment expressed by the user when a particular actor or scene of the displayed content is presented by the content presentation system 104 may be stored in the user's profile. The user profile may facilitate advertisements being chosen by the targeting engine 118 as targeted content 122 for presentation by the content presentation system 104 based upon the profiled user's likes and dislikes. The user profile may also include demographic information pertaining to the user, e.g., age, gender, occupation, hobbies, interests, etc. The user profile may also include information pertaining to relationships with other users. For example, a user profile for a user may identify another user having a different user profile and specify a relationship with the other user, e.g., that the user is a father of the other user, a mother of the other user, in a romantic relationship with the other user, married to the other user, etc.

4. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 4:
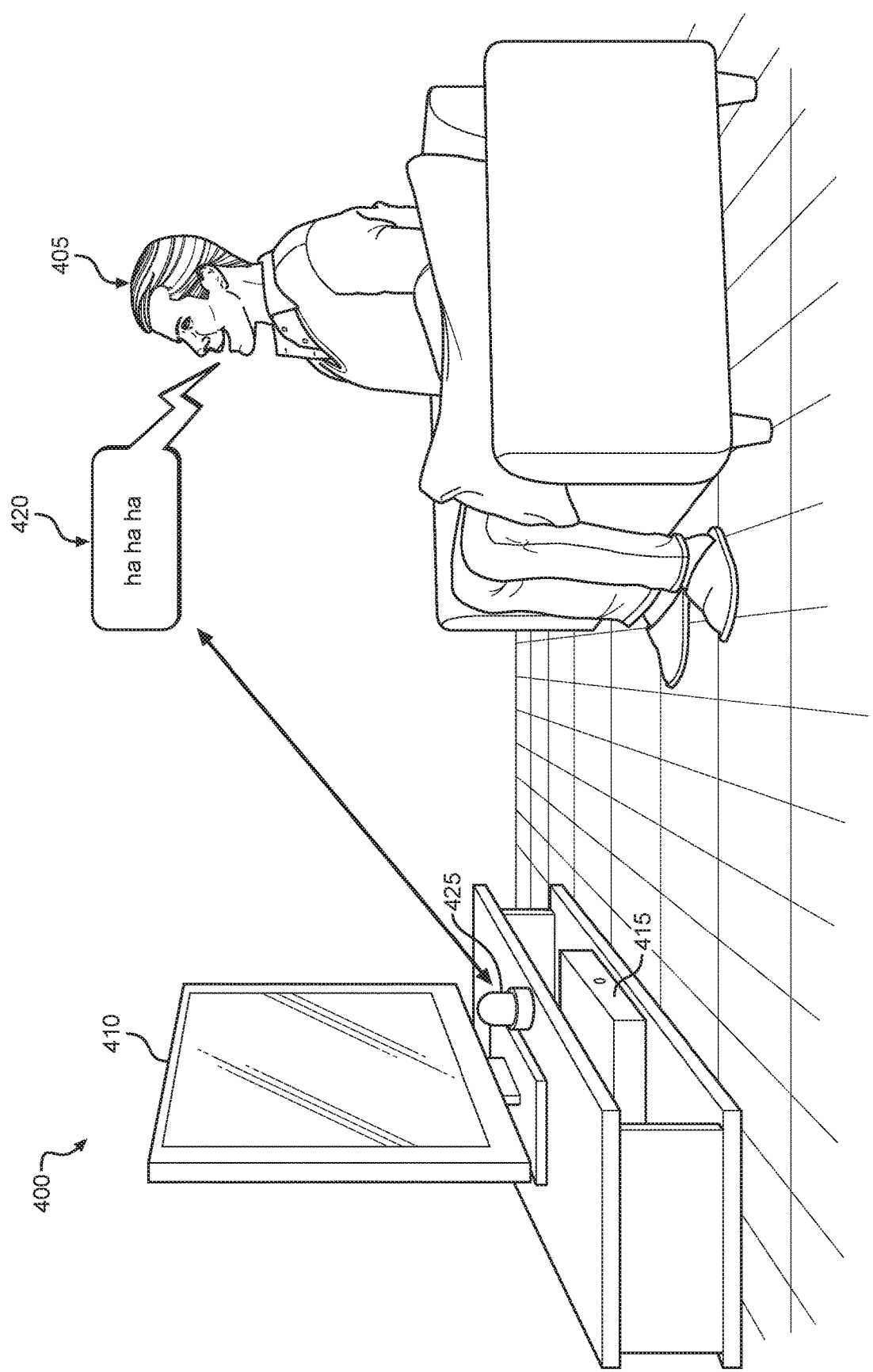
FIG. 4 illustrates an example application of detecting an audible expression associated with content displayed in a physical environment, in accordance with one or more embodiments.

FIG. 4 illustrates an example application of detecting an audible expression associated with content displayed in a physical environment 400, in accordance with one or more embodiments. The physical environment 400 may include an embodiment of the physical environment 110 described elsewhere herein. A user 405 may watch and/or listen to content presented to the user 405 via a content presentation system 410. The content may include audio and/or video content, e.g., a televised football game, a television program such as a sitcom, a movie, etc. The content presentation system 410 may include an embodiment of the content presentation system 104 described elsewhere herein. The content presentation system 410 may be controlled to present the content to the user 405 by a controller 415. The controller 415 may include an embodiment of the controller 102 described elsewhere herein.

While the user 405 is watching and/or listening to the content presented by the content presentation system 410, the user 405 may make an audible expression 420 in response to the content, and thereby interact with the content presentation system 410. For example, the user 405 may laugh (e.g., "ha ha ha") in response to a joke or funny situation upon seeing their favorite comedian in a TV show.

An audio/video sensor 425 may monitor the audio soundscape in the room and detect the audible expression 420, and provide information pertaining to the audible expression 420 to the controller 415. The audio/video sensor 425 may include an embodiment of the audio/video sensor 106 described elsewhere herein. The audio/video sensor 425 may include a digital video camera and/or a microphone. The audio/video sensor 425 may provide an audio soundscape of the physical environment 400, including the audible expression 420 of the user 405, to the controller 415. The audio/video sensor 425 may also provide visible light image and/or an infrared image of the user 405 and portions of the physical environment 400 to the controller 415. The audio/video sensor 425 may also provide depth information, e.g., a depth of the physical environment 400 from the audio/video sensor 425 to a back of the physical environment 400, a distance from the audio/video sensor 425 to the user 405, etc. The depth information may be determined using various audio and/or video signal processing techniques, e.g., SONAR or techniques similar to those used to focus photographic lenses on particular subjects within a field of view of a camera.

The controller 415 may correlate the detected audible expression 420 and information imputed from the detected audible expression 420 with the media presented by the content presentation system 410 at the time the audible expression 420 is detected. The correlation may be performed over time, so that different audible expressions 420 and their corresponding imputed information is correlated with different time points in the presented media. For example, excitement, happiness, and disinterest may be imputed from detected user audible expressions 420, and this imputed information may be correlated with different scenes of presented media, e.g., different scenes in a movie or TV show, different commercial advertisements, different news stories, etc. This correlated information may be stored and/or transmitted to a server (e.g., the server 108) for analysis.

The analysis to be performed on the correlated information may involve corresponding correlated information from other users of other similar content presentation systems 410 presenting the same media, either at a same time or a different time. For example, a percentage of the population that watched and/or enjoyed a particular program presented by the content presentation system 410 may be determined, as well as demographics of the users that watched and/or enjoyed the program. In addition, more granular information pertaining to what percentage of the population watched and/or enjoyed particular scenes or segments of the program may be determined, as well as the demographics of the users that watched and/or enjoyed those particular scenes or segments of the program. User reactions to particular aspects of programs, e.g., particular jokes in a comedy or particular scenes in a movie, may be determined according to a percentage of total users viewing the program and/or demographics of the users viewing the program. The user reactions may also be used to make value judgments regarding various aspects of the program viewed, e.g., which scenes and/or which actors in the program have the greatest effect on the ratings of the program viewed. These user reactions may also be used to determine the content of future programs such as television programs and movies.

Furthermore, demographic information of users 405 that enjoyed a particular program may be used for targeting advertisements to be presented to particular users that match ideal demographics and/or preferences for the advertisements. For example, advertisements for football-related products may be targeted to users that have been detected as being happy or excited about football games and not toward users that have been disinterested in football games. As another example, advertisements for a particular type of product (e.g., sodas) may be targeted to users that have been detected as being happy or excited about previous commercials for that particular type of product, and not those that have been detected as not being interested in advertisements for that particular type of product. Likewise, advertisements for a particular brand of product (e.g., sodas) may be targeted to users that have been detected as being happy or excited about previous commercials for a competing brand of the product (e.g., sodas).

The analysis may be performed in real-time so that targeted content 122 (e.g., targeted commercial advertisements) may be directed to the user according to the real-time user reactions to the presented content (e.g., media 120). Furthermore, the analysis may facilitate pricing of commercial advertisements to be determined according to the sentiment of many users watching the presented content. For example, as user engagement increases, e.g., toward the end of a big football game, pricing for commercial advertisements may increase. When the pricing increases, predetermined price ranges for various commercial advertisements may be analyzed to determine which commercial advertisements are to be presented as targeted content 122. Likewise, as detected user engagement changes, predetermined user engagement ranges for various commercial advertisements may be analyzed to determine which commercial advertisements are to be presented as targeted content 122. Various other demographic and user information as discussed herein may also be used to determine the targeted content 122 to present to the user 405 via the content presentation system 410. The targeted content 122 may be predetermined to be presented to a user 405 that meets certain demographic, engagement, and/or sentiment characteristics. For example, certain advertisements may be targeted to a certain user 405 when the user 405 is detecting as being happy, while other advertisements may be targeted to the certain user 405 when the user 405 is detected as being sad, etc.

The analysis of aggregated data from many users 405 may facilitate providing providers of the media 120 and/or targeted content 122 with information pertaining to the demographics of users 405 that watch and/or enjoy their programs. This information may be more specific than information pertaining to the number of households who watch their programs. For example, the identity of each user 405 that watches and/or enjoys a particular media 120 or targeted content 122 may be determined according to facial recognition and/or other means, and demographic information specific to the detected user 405 may be stored and/or transmitted to a server pertaining to the media 120 or targeted content 122. For example, within a single household, one user 405 (e.g., a parent) may watch and/or enjoy one type of program (e.g., a mystery) while another user 405 (e.g., a child) may watch and/or enjoy a different type of program (e.g., an action/adventure). The demographic information provided in response to the parent watching the mystery program may be different than the demographic information provided in response to the child watching the action/adventure program. Collectively, information gathered from many different users 405 may more accurately measure the demographics of viewers of various programs than merely a percentage of households that view the programs. Likewise, different targeted content 122 may be presented to different users 405 within a single household according to the different stored demographics and/or preferences of the different users 405.

While a single user 405 is illustrated in FIG. 4, in various embodiments, there may be more users in the physical environment 400 watching the content presentation system 410. For example, the user 405 may be holding a baby or child, or the user 405 may be accompanied by a friend, parent, or significant other. When there are a plurality of users 405 present to watch and/or listen to the content presented by the content presentation system 410, each of the users 405 may individually make audible expressions in response to the content, and thereby interact with the content presentation system 410. For example, each of the users 405 may laugh or boo in response to a scene of a movie. Some of the users 405 may laugh while others do not at different moments in time while watching the content presented by the content presentation system 410.

The audio/video sensor 425 may monitor the audible expressions of each of the users 405 asynchronously, e.g., vi a multi-microphone array included in the audio/video sensor 425, and provide information pertaining to whether each of the users 405 is laughing or booing to the controller 415. The audio/video sensor 425 may monitor the aggregate audible expressions of the users 405 in the audio soundscape of the physical environment 400 and provide information pertaining to whether the aggregate of the users 405 is laughing or booing to the controller 415 based on an overriding volume of sensed laughter or booing. When information regarding a sentiment of each of the users 405 present in the physical environment 400 is determined according to an analysis of each of the users' 405 individually detected and identified audible expressions, the controller 415 may then compute a group sentiment based upon the individual sentiments detected for each of the users 405 according to a threshold percentage or number of the users 405 that are detected as expressing the group sentiment. When information regarding aggregate audible expressions 420 of the users 405 in the audio soundscape of the physical environment 400 is available, the group sentiment may be determined according to the aggregate audible expressions 420. For example, when a majority of the users 405 is detected as having a sentiment of happiness, e.g., via being detected as laughing, then the group sentiment may be determined to be happiness at that moment in time. This may be determined when the soundscape detected by the audio/video sensor 425 is overwhelmingly dominated by laughter, for example.

A count or estimated count of the users 405 present in the physical environment 400 may be taken over a period of time as the media 120 and/or targeted content 122 is presented to the group of users 405. The count may be estimated based on a number of users 405 detected visually, by presence of Bluetooth or WiFi devices in the physical environment, and/or by the detection of overlapping separate voices. The count of the users 405 over time may be correlated with metadata of the media 120 and/or targeted content 122 over time to at least aid in determining a sentiment and/or engagement with the media of the users 405 in relation to the media 120 and/or targeted content 122.

Information pertaining to relationships between any of the individual users 405 may be obtained from the user profiles of the detected users 405 and used to determine the targeted content 122 to be presented to the group of users 405 by the content presentation system 410. In this way, detected relationships between any of the users 405, e.g., detected family relationships, may dictate the targeted content 122 that is selected and presented to the users 405 via the content presentation system 410. For example, if the group of users 405 is detected to include a father-son pair, commercial advertisements intended for mother-daughter pairs may not be included in the targeted content 122, but commercial advertisements intended for father-son pairs may be selected to be included in the targeted content 122. Likewise, if a couple that is romantically involved with one another is detected among the group of users 405, commercial advertisements for vacations for a couple may be included in the targeted content 122, but not included otherwise. Additionally, if a parent and a child of that parent are both watching a program together, then commercial advertisements for an amusement park for families with children or toys for children may be included in the targeted content 122 and not included otherwise.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
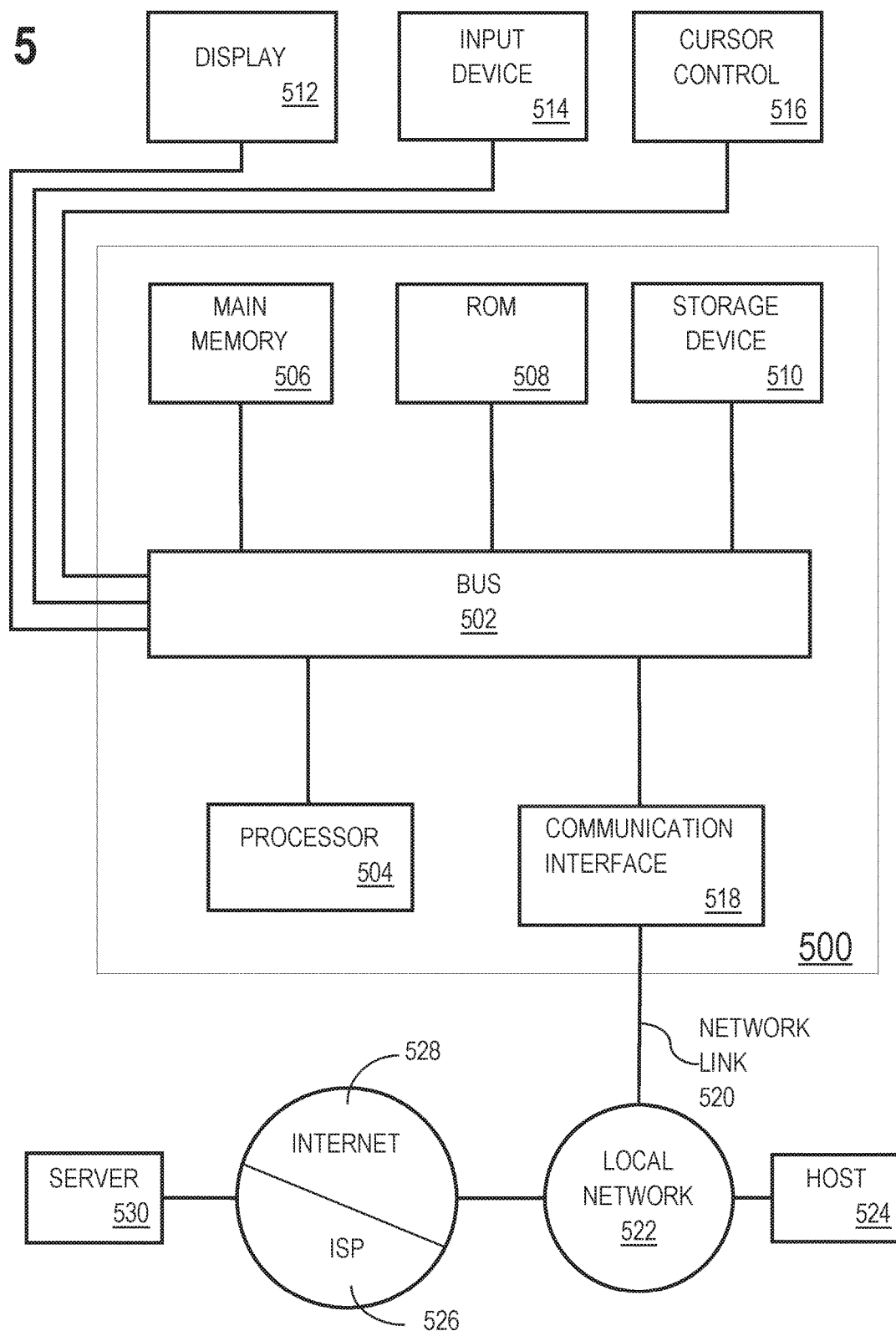
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

identifying a first content displayed by a content presentation system associated with a physical environment;

detecting, by one or more sensors, electronic signals representing one or more audible expressions made by a user located within the physical environment;

performing audio signal processing on the electronic signals to determine information associated with the audible expressions, the information associated with the audible expressions comprising an engagement level of the user in relation to the first content, wherein the engagement level of the user in relation to the first content is determined from a range of engagement levels including at least three different engagement levels;

based at least on the engagement level of the user in relation to the first content: determining pricing for presenting targeted content to the user;

analyzing a plurality of predetermined price ranges for a plurality of contents, including a particular predetermined price range for a particular content;

responsive to determining that the pricing determined for presenting the targeted content to the user based on the engagement level of the user in relation to the first content is within the particular predetermined price range for the particular content:

selecting the particular content as the targeted content to be presented to the user.

2. The medium of claim 1, wherein the operations further comprise: performing speech recognition on the electronic signals representing the audible expressions to determine the information associated with the audible expression.

3. The medium of claim 2, wherein performing speech recognition is according to a pre-defined confidence threshold.

4. The medium of claim 1, wherein the operations further comprise:
selecting the targeted content based on the engagement level of the user in relation to the first content.

5. The medium of claim 1, wherein the targeted content comprises an advertisement.

6. The medium of claim 1, wherein the targeted content comprises at least one of an audio program or a video program.

7. The medium of claim 1, wherein:
the information associated with the audible expressions further comprises a user sentiment; and
the operations further comprise: selecting the targeted content based on the user sentiment.

8. The medium of claim 7, wherein the operations further comprise:
determining that the audible expressions comprise laughter at least by identifying an audio pattern correlated with laughter in at least one of the audible expressions;
determining the user sentiment based on determining that the audible expressions comprise laughter.

9. The medium of claim 1, wherein the operations further comprise: transmitting the targeted content to the content presentation system.

10. The medium of claim 1, wherein:
the information associated with the audible expressions further comprises a meaning of at least one of the audible expressions; and
the operations further comprise: selecting the targeted content based on the meaning of at least one of the audible expressions.

11. The medium of claim 1, wherein the operations further comprise: determining a user preference based on the information associated with the audible expressions; selecting the targeted content based on the user preference.

12. The medium of claim 11, wherein the user preference is further based on the first content displayed by the content presentation system.

13. The medium of claim 11, wherein determining the user preference comprises:
parsing words included in the information associated with the audible expressions;
determining a name about which the user has a preference by comparing the parsed words with an index of names; and
determining the user preference regarding the determined name according to conjunction and comparison operators included in the parsed words.

14. The medium of claim 1, wherein:
the information associated with the audible expressions further comprises a user emotion mapped to at least one of the audible expressions;
selecting the targeted content based on the user emotion.

15. The medium of claim 1, wherein the operations further comprise:
identifying the user by performing at least one of facial recognition and voice recognition;
storing the information associated with the audible expressions in relation to the identified user.

16. The medium of claim 1, wherein the operations further comprise:
identifying the user according to a detected mobile payment system;
storing the information stored associated with the audible expressions in relation to the identified user.

17. The medium of claim 1, wherein the operations further comprise:
identifying the user by performing at least one of facial recognition and voice recognition;
computing a sentiment associated with the user based on the electronic signals representing the audible expressions of the user; and
storing the sentiment associated with the user in relation to the first content.

18. The medium of claim 1, wherein the operations further comprise:
detecting a plurality of audible expressions of the user at a plurality of points in time; and
storing a time-indexed stream of information associated with the plurality of audible expressions in relation to points in time of the first content.

19. The medium of claim 1, wherein:
storing the engagement level of the user in relation to the first content, based on a particular characteristic associated with the first content being displayed.

20. The medium of claim 1, wherein the operations further comprise:
selecting a grammar index, of a plurality of grammar indices, associated with the user;
wherein the plurality of grammar indices are associated respectively with the plurality of users, and each of the plurality of grammar indices associates different vocal characteristics with a same set of one or more words; and
recognizing a verbal statement included in the audible expressions based on the grammar index associated with the user.

21. A system comprising:
one or more devices, each including one or more hardware processors; and
the system being configured to perform operations comprising:
identifying a first content displayed by a content presentation system associated with a physical environment;
detecting, by one or more sensors, electronic signals representing one or more audible expressions made by a user located within the physical environment;
performing audio signal processing on the electronic signals to determine information associated with the audible expressions, the information associated with the audible expressions comprising an engagement level of the user in relation to the first content, wherein the engagement level of the user in relation to the first content is determined from a range of engagement levels including at least three different engagement levels;
based at least on the engagement level of the user in relation to the first content:
determining pricing for presenting targeted content to the users;
analyzing a plurality of predetermined price ranges for a plurality of contents, including a particular predetermined price range for a particular content;

responsive to determining that the pricing determined for presenting the targeted content to the user based on the engagement level of the user in relation to the first content is within the particular predetermined price range for the particular content:
selecting the particular content as the targeted content to be presented to the user.

22. A method comprising:
identifying a first content displayed by a content presentation system associated with a physical environment;
detecting, by one or more sensors, electronic signals representing one or more audible expressions made by a user located within the physical environment;
performing audio signal processing on the electronic signals to determine information associated with the audible expressions, the information associated with the audible expressions comprising an engagement level of the user in relation to the first content, wherein the engagement level of the user in relation to the first content is determined from a range of engagement levels including at least three different engagement levels;
based at least on the engagement level of the user in relation to the first content:
determining pricing for presenting targeted content to the user;
analyzing a plurality of predetermined price ranges for a plurality of contents, including a particular predetermined price range for a particular content;
responsive to determining that the pricing determined for presenting the targeted content to the user based on the engagement level of the user in relation to the first content is within the particular predetermined price range for the particular content:
selecting the particular content as the targeted content to be presented to the user;
wherein the method is performed by one or more devices, each including one or more hardware processors.

23. A non-transitory computer readable medium comprising instructions which, when executed by one or more hardware processors, causes performance of operations comprising:
identifying a first content displayed by a content presentation system associated with a physical environment;
detecting, by one or more sensors, electronic signals representing one or more audible expressions made by a user located within the physical environment;
performing audio signal processing on the electronic signals to determine information associated with the audible expressions, the information associated with the audible expressions comprising an engagement level of the user in relation to the first content, wherein the engagement level of the user in relation to the first content is determined from a range of engagement levels including at least three different engagement levels;
wherein determining the engagement level of the user in relation to the first content is based on at least one of:
a number of the audible expressions detected during a particular time period; and
an amount of elapsed time between the audible expressions detected during the particular time period; and
storing the information associated with the audible expressions in relation to the displayed content.

24. A non-transitory computer readable medium comprising instructions which, when executed by one or more hardware processors, causes performance of operations comprising:
identifying a first content displayed by a content presentation system associated with a physical environment;
detecting, by one or more sensors, electronic signals representing one or more audible expressions made by a user located within the physical environment;
performing audio signal processing on the electronic signals to determine information associated with the audible expressions;
wherein the information associated with the audible expressions comprises an engagement level of the user in relation to the first content, the engagement level of the user in relation to the first content being determined from a range of engagement levels including at least three different engagement levels;
wherein determining the information associated with the audible expressions comprises:
selecting a grammar index, of a plurality of grammar indices, associated with the user;
wherein the plurality of grammar indices are associated respectively with a plurality of users, and each of the plurality of grammar indices associates different vocal characteristics with a same set of one or more words; and
recognizing a verbal statement included in the audible expressions based on the grammar index associated with the user and a first set of vocal characteristics represented by the electronic signals; and
storing the information associated with the audible expressions in relation to the displayed content;
detecting, by the one or more sensors, a second set of electronic signals representing a second set of one or more audible expressions made by a second user located within the physical environment;
selecting a second grammar index, of the plurality of grammar indices, associated with the second user;
recognizing the same verbal statement included in the second set of audible expressions based on the second grammar index associated with the second user and a second set of vocal characteristics represented by the second set of electronic signals, wherein the first set of vocal characteristics and the second set of vocal characteristics are different.

* * * * *